US010447931B2

(12) United States Patent
Hu et al.

(10) Patent No.: US 10,447,931 B2
(45) Date of Patent: Oct. 15, 2019

(54) CAMERA MODULE HAVING ELECTROMAGNETIC DRIVING ASSEMBLY

(71) Applicant: TDK Taiwan Corp., Yangmei Taoyuan (TW)

(72) Inventors: Chao-Chang Hu, Yangmei Taoyuan (TW); Fu-Yuan Wu, Yangmei Taoyuan (TW); Kuo-Chun Kao, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 56 days.

(21) Appl. No.: 15/476,521

(22) Filed: Mar. 31, 2017

(65) Prior Publication Data

US 2017/0289457 A1  Oct. 5, 2017

Related U.S. Application Data

(60) Provisional application No. 62/316,845, filed on Apr. 1, 2016.

(30) Foreign Application Priority Data

Mar. 20, 2017 (CN) .......................... 2017 1 0166494

(51) Int. Cl.
H04N 5/232 (2006.01)
G02B 27/64 (2006.01)
H02K 33/02 (2006.01)
G02B 7/08 (2006.01)
G02B 13/00 (2006.01)

(52) U.S. Cl.
CPC ........... *H04N 5/23287* (2013.01); *G02B 7/08* (2013.01); *G02B 27/646* (2013.01); *H02K 33/02* (2013.01); *G02B 13/001* (2013.01)

(58) Field of Classification Search
CPC .............. H04N 5/2328; H04N 3/1562; H04N 5/23248; H04N 5/23258; H04N 5/23287; G03B 2205/0007; G03B 2205/0023; G03B 2205/0038; G03B 2205/0015; G02B 27/64; G02B 27/646; G02B 7/04
See application file for complete search history.

(56) References Cited

U.S. PATENT DOCUMENTS

| 2006/0133738 | A1* | 6/2006 | Marcinkiewicz | .... H04B 1/3833 385/88 |
| 2010/0277800 | A1* | 11/2010 | Wu | ......................... G02B 7/08 359/513 |
| 2012/0268642 | A1* | 10/2012 | Kawai | ................... G02B 27/646 348/335 |
| 2013/0010137 | A1* | 1/2013 | Kawai | ................ H04N 5/23258 348/208.1 |

(Continued)

Primary Examiner — Chia Wei A Chen
(74) Attorney, Agent, or Firm — Muncy, Geissler, Olds & Lowe, P.C.

(57) ABSTRACT

A camera module is provided, including a frame, a holder, an image sensor, a plate, an electromagnetic driving assembly, and an elastic element. The frame connects the holder with the plate. The holder is configured to sustain an optical lens, and the image sensor is disposed on the plate. The elastic element connects the frame with the plate. The electromagnetic driving assembly is disposed on the frame and the plate, and is configured to drive the plate and the image sensor to move with respect to the frame and the holder.

9 Claims, 13 Drawing Sheets

(56) References Cited

U.S. PATENT DOCUMENTS

| | | | | |
|---|---|---|---|---|
| 2014/0354860 A1* | 12/2014 | Yuge | ............ | G02B 27/646 |
| | | | | 348/241 |
| 2015/0370033 A1* | 12/2015 | Song | ............ | H02K 7/08 |
| | | | | 359/824 |
| 2016/0025951 A1* | 1/2016 | Park | ............ | G02B 27/646 |
| | | | | 359/824 |
| 2016/0165103 A1* | 6/2016 | Topliss | ............ | H04N 5/2253 |
| | | | | 348/373 |
| 2016/0178923 A1* | 6/2016 | Hayashi | ............ | G02B 7/04 |
| | | | | 359/557 |
| 2016/0178925 A1* | 6/2016 | Park | ............ | G02B 7/09 |
| | | | | 359/557 |
| 2016/0241785 A1* | 8/2016 | Chiouchang | ............ | H04N 5/23287 |
| 2016/0274375 A1* | 9/2016 | Park | ............ | G02B 7/04 |
| 2017/0353662 A1* | 12/2017 | Enta | ............ | G03B 5/00 |
| 2018/0288331 A1* | 10/2018 | Kadowaki | ............ | H04N 5/23287 |
| 2018/0324334 A1* | 11/2018 | Wippermann | ............ | G02B 7/008 |

* cited by examiner

CAMERA MODULE HAVING ELECTROMAGNETIC DRIVING ASSEMBLY

CROSS REFERENCE TO RELATED APPLICATIONS

This application claims priority claims priority of provisional U.S. Patent Application Ser. No. 62/316,845 filed on Apr. 1, 2016 and China Patent Application No. 201710166494.4 filed on Mar. 20, 2017, the entirety of which is incorporated by reference herein.

BACKGROUND OF THE INVENTION

Field of the Invention

The application relates in general to a camera module, and in particular to a camera module provided with an electromagnetic drive assembly to force an image sensor to move.

Description of the Related Art

Thanks to ongoing technological development, recent electronic devices (such as tablet computers and smartphones) usually include a lens module capable of aiding in photography or recording video. However, an image may come out blurry if the user shakes the lens module in the electronic device. To improve image quality, it is increasingly important to design a shockproof lens module.

BRIEF SUMMARY OF INVENTION

To address the deficiencies of conventional products, an embodiment of the invention provides a camera module disposed in an electronic device, including a holder, a frame, an image sensor, a plate, an electromagnetic driving assembly, and an elastic element. The frame is affixed to a casing of the electronic device and connects the holder with the plate. The holder is configured to sustain an optical lens, and the image sensor is disposed on the plate. The elastic element connects the frame with the plate. The electromagnetic driving assembly is disposed on the frame and the plate, and is configured to drive the plate and the image sensor to move relative to the frame and the holder.

In some embodiments, the elastic element extends along the optical axis of the optical lens and connects the frame to the plate.

In some embodiments, the camera module further comprises a circuit board, and the electromagnetic driving assembly includes a first driving coil, wherein the circuit board is affixed between the first driving coil and the plate, and the elastic element connects to the circuit board.

In some embodiments, the camera module further comprises an upper spring connecting the frame to the holder, wherein the elastic element connects to the upper spring.

In some embodiments, the camera module further comprises an optical transceiver assembly including a first optical coupling element and a second optical coupling element which are respectively disposed on the image sensor and the circuit board, configured to transmit an optical signal.

In some embodiments, the electromagnetic driving assembly includes a magnetic element and a first driving coil, wherein the magnetic element is disposed on the frame, and the first driving coil is disposed on the plate.

In some embodiments, the first driving coil is disposed between the magnetic element and the plate along an optical axis of the optical lens, and a gap is formed between the first driving coil and the magnetic element.

In some embodiments, the camera module further comprises a second driving coil disposed around the holder, wherein when a magnetic force is provided by the interaction between the magnetic element and the second driving coil, the holder and the optical lens move relative to the frame along an optical axis of the optical lens.

In some embodiments, the electromagnetic driving assembly further includes a plurality of first driving coils disposed on the same side of the plate, and when a magnetic force is provided by the interaction between the magnetic element and the first driving coils, the plate and the image sensor move relative to the frame and the holder.

In some embodiments, the electromagnetic driving assembly further includes a plurality of first driving coils and a plurality of magnetic elements, and the first driving coils are disposed on different sides of the plate, wherein when a magnetic force is provided by the interaction between the magnetic elements and the first driving coils, the plate and the image sensor move relative to the frame and the holder.

In some embodiments, the electromagnetic driving assembly further includes a plurality of magnetic elements disposed on the same side of the frame, wherein a magnetic force is provided between the magnetic elements and the first driving coil to force the plate and the image sensor to move relative to the frame and the holder.

Another embodiment of the invention provides a camera module disposed in an electronic device, including a lens unit, an image sensor, a plate, a bottom, and an electromagnetic driving assembly. The plate sustains the image sensor and connects to the lens unit, and the bottom is affixed to a casing of the electronic device and connected to the plate. The electromagnetic driving assembly is disposed on the plate and the bottom and is configured to force the plate and the image sensor to move relative to the bottom.

In some embodiments, the electromagnetic driving assembly includes a magnetic element and a first driving coil disposed on the bottom and the plate, respectively.

In some embodiments, the camera module further comprises an elastic element extending along a central axis of the plate and connecting the plate to the bottom.

In some embodiments, the camera module further comprises a roller disposed between the plate and the bottom.

In some embodiments, the upper surface of the bottom has an elongated-shaped recess that extends in a first direction and at least receives a portion of the roller.

In some embodiments, the lower surface of the first driving coil has an elongated-shaped recess that extends in a second direction and at least receives a portion of the roller, wherein the first direction and the second direction are substantially perpendicular to each other.

In some embodiments, the camera module further comprises a magnet and a permeability element respectively disposed on the bottom and the first driving coil, wherein the magnet attracts the permeability element.

In some embodiments, the lens unit and the plate are affixed to each other, and the electromagnetic driving assembly forces the plate, the image sensor, and the unit lens to move together relative to the bottom.

In some embodiments, the image sensor is disposed between the lens unit and the electromagnetic driving assembly in the direction of the central axis of the plate.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the camera modules are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
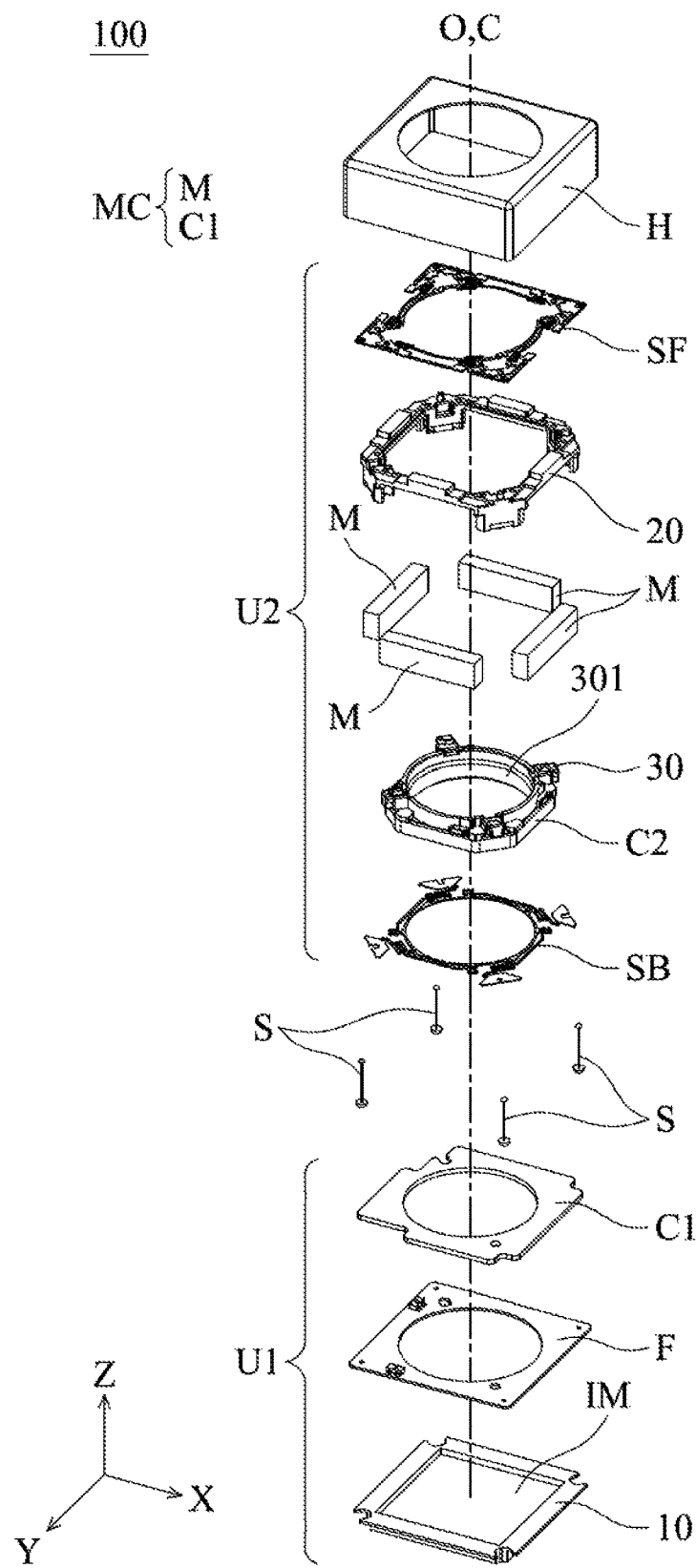
FIG. 1 is an exploded view of a camera module 100 according to an embodiment of the invention.
Figure 2:
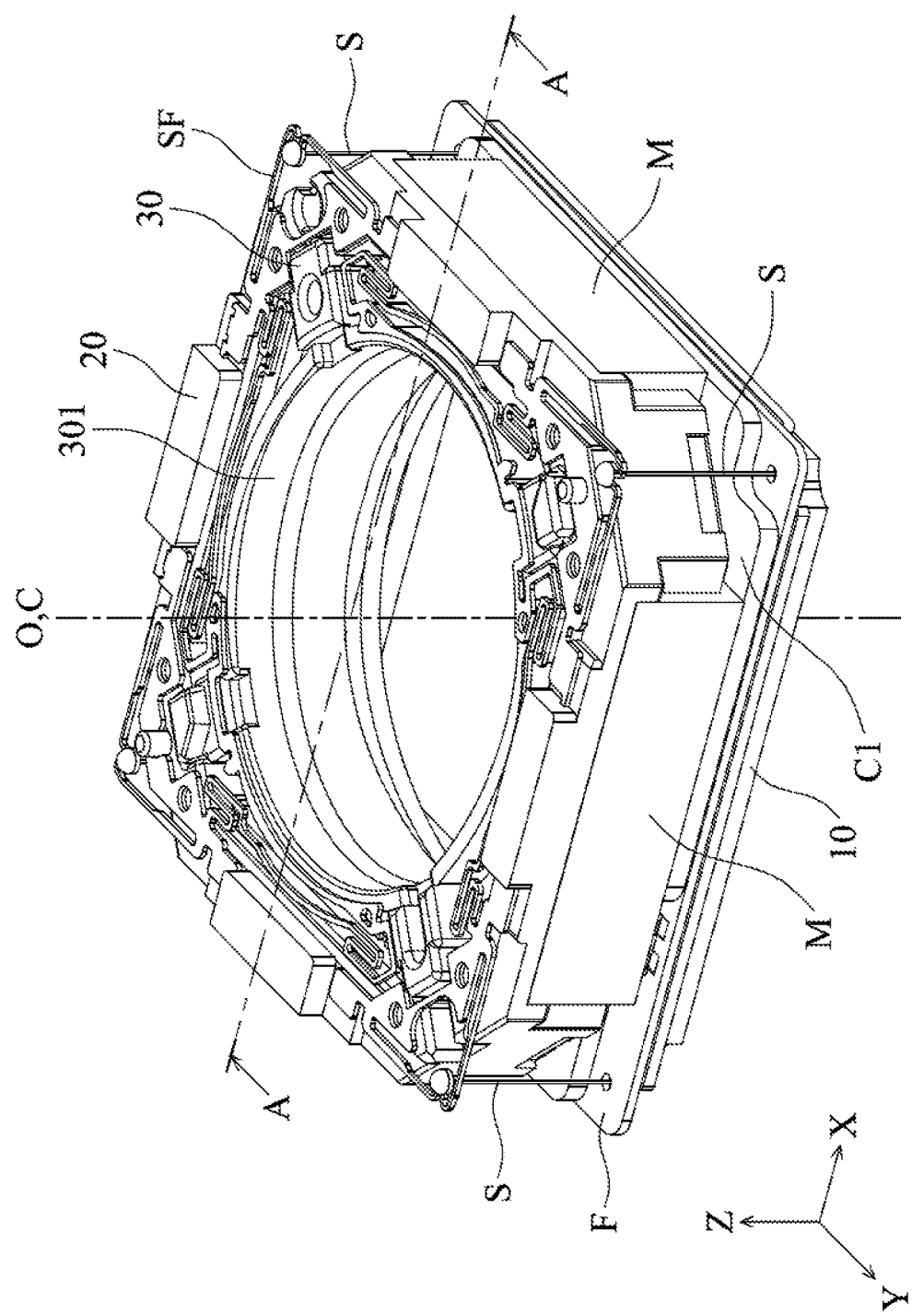
FIG. 2 is a schematic diagram of the camera module in FIG. 1 after assembly.

FIG. 1 is an exploded-view diagram of a camera module 100 according to an embodiment of the invention, and FIG. 2 is a schematic diagram of the camera module 100 in FIG. 1 after assembly and a housing 40 thereof is omitted. The camera module 100 can be disposed in an electronic device, such as a camera, a tablet computer, or a cell phone, and it can be configured with an optical lens (not shown) and an image sensor IM disposed therein. The optical lens and the image sensor are movable with a casing of the electronic device, so that the camera module 100 has an auto-focusing (AF) function and optical image stabilization (OIS).

As shown on FIGS. 1 and 2, the camera module 1 comprises a photosensitive unit U1, a lens unit U2, a housing H, and a plurality of elongated elastic elements (connecting members) S connecting the photosensitive unit U1 to the lens unit U2, wherein the photosensitive unit U1, the lens unit U2, and the elastic elements S are covered by the housing H configured to protect them. The photosensitive unit U1 primarily includes a plate 10, an image sensor IM, a circuit board F, and a first driving coil C1 (such as a flat coil with a plate structure). The lens unit U2, such as a lens driving mechanism with optical image stabilization, primarily includes a frame 20, a plurality of magnetic elements M, a holder 30, a second driving coil C2, a upper spring SF, and a lower spring SB (these springs, for example, have a sheet structure). The plate 10 is configured to sustain the image sensor IM, and an optical lens (not shown) is disposed in a receiving space 301 of the holder 30. The image sensor IM is configured to receive light from the outside of the camera module 100 and through the optical lens so that it is able to acquire an image. It should be understood that the image sensor IM of the photosensitive unit U1 is movable relative to the lens unit U2 by the interaction between the magnetic elements M and the first driving coil C1 (a magnetic force is generated); and the holder 30 and the optical lens of the lens unit U2 are movable relative to the frame 20 and the image sensor IM by the interaction between the magnetic elements M and the second driving coil C2. Therefore, the camera module 100 has an auto-focusing function and optical image stabilization.

Figure 3:
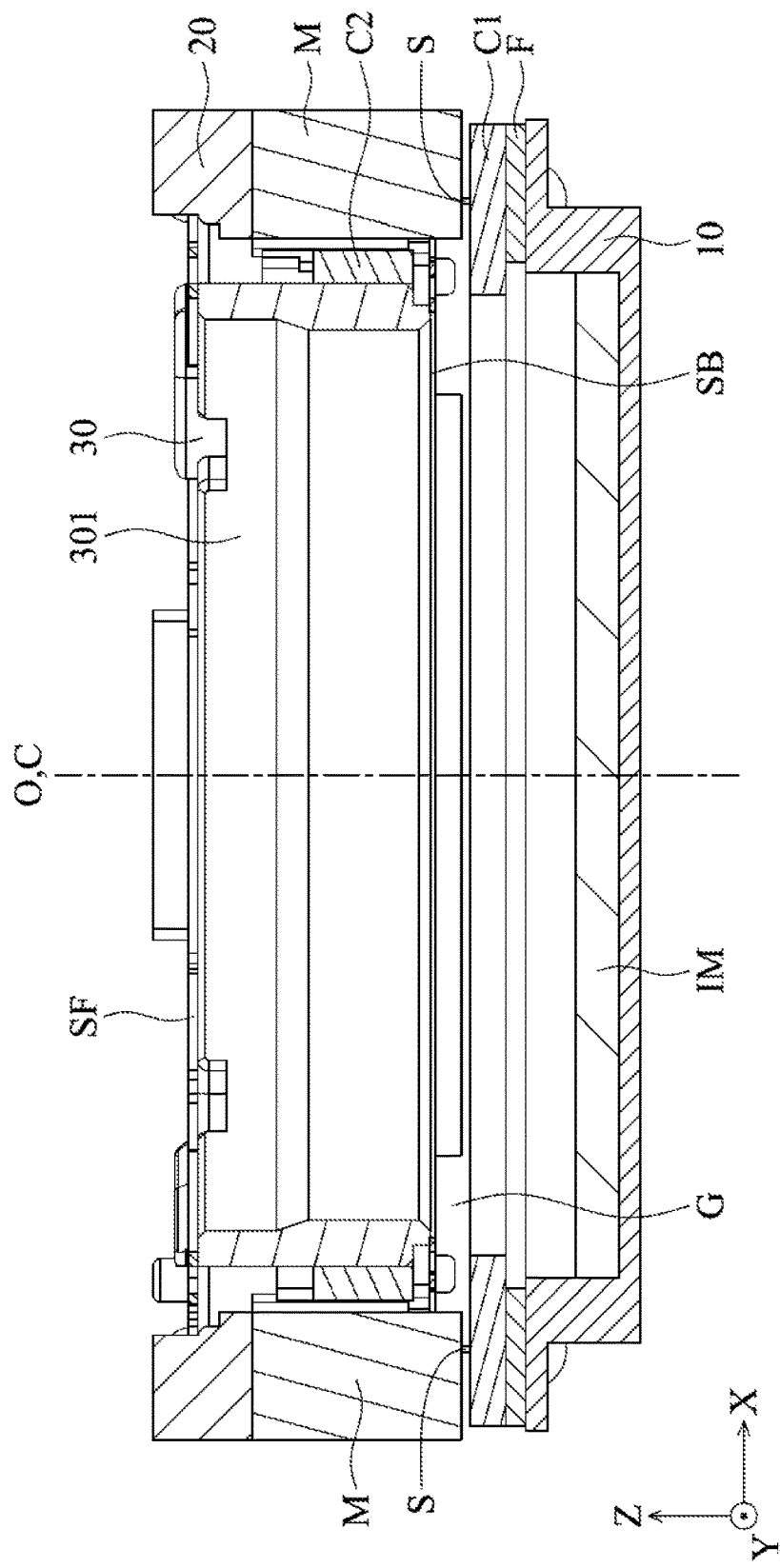
FIG. 3 is a sectional view diagram taken along line A-A in FIG. 2.

The details of the lens unit U2 are described below; the photosensitive unit U1 and the connection with the lens unit U2 will be described later. Referring to FIGS. 2 and 3 (FIG. 3 is a sectional view diagram taken along line A-A in FIG. 2), the holder 30 is movably connected to the frame 20 via the upper spring SF and the lower spring SB (such as springs comprising metal), wherein the frame 20, for example, can be affixed to a casing of an electronic device, and the holder 30 is situated between the upper spring SF and the lower spring SB. The second driving coil C2 is disposed around the holder 30 and electrically connected to the upper spring SF. The four magnetic elements M (such as magnets) are respectively disposed on the four different sides of the frame 20 and face the second driving coil C2. In the present embodiment, the second driving coil C2 can be connected to an external power source via the upper spring SB to receive a driving signal (e.g., electrical current), so that a magnetic force is generated by the second driving coil C2 interacting with the magnetic elements M to force the holder 30 and the optical lens to move relative to the frame 20 and the plate 10 (sustaining the image sensor IM) along an optical axis O of the optical lens (Z-axis), to achieve the function of auto-focusing. Furthermore, before applying the driving signal, the holder 30 can be positioned at an initial position with respect to the frame 20 by the upper spring SF and the lower spring SB.

The details of the photosensitive unit U1 are described below. Still referring to FIGS. 2-3, the photosensitive unit U1 is disposed under the lens unit U2, and the plate 10 is affixed to the circuit board F and the first driving coil C1, wherein the circuit board F may be a flexible printed circuit board (FPCB). The circuit board F is disposed between the plate 10 and the first driving coil C1 and electrically connected to the first driving coil C1, so that a driving signal can be applied to the first driving coil C1 by an external power source (not shown).

A detailed description of the connection between the photosensitive unit U1 and the lens unit U2 is provided below. As shown in FIGS. 1-2, the four elastic elements S are respectively disposed at the four corners of the upper spring SF, and the two ends of each elastic element S are respectively connected to the upper spring SF and the circuit board F. Thus, the photosensitive unit U1 is connected to the lens unit U2, and the optical axis O of the optical lens is coincide with a central axis of C the plate 10. The first driving coil C1 is adjacent to the magnetic elements M and an electromagnetic drive assembly MC is constituted by the first driving coil C1 and the magnetic elements M. Moreover, a gap G (FIG. 3) is formed between the first driving coil C1 and the magnetic elements M in the direction of the Z-axis, wherein the first driving coil C1 is closer to the frame 20 and the holder 30 than the plate 10 and the image sensor IM. As described above, the upper spring SF is movably connected to the holder 30 and the frame 20 with the magnetic elements M, and the circuit board F is affixed to the first driving coil C1 and the plate 10, wherein the plate 10 and the image sensor IM are connected to the frame 20 in a suspended manner via the elastic elements S. Thus, when the electromagnetic drive assembly MC forces the plate 10 to move (for example, by applying an appropriate drive signal, the first driving coil C1 interacts with the magnetic elements M disposed on the frame 20 to generate a magnetic force), the plate 10 and the image sensor IM move linearly relative to the frame 20 in a direction that is substantially perpendicular to the optical axis O or the central axis C (parallel to the XY-plane). Therefore, when the optical lens shakes, optical compensation can be provided by the aforementioned mechanism, to acquire high-quality images, in order to achieve the purpose of optical image stabilization.

In the present embodiment, the first driving coil C1 and the circuit board have a substantially rectangular structure and a substantially circular through hole (as shown in FIG. 1), so that the image sensor IM can successfully receive light from the outside and through the optical lens to obtain the image. Furthermore, in another embodiment, only one magnetic element M may be provided and it interacts with the first driving coil C1, so that the image sensor IM can move relative to the frame 20 and the holder 30 (sustaining the optical lens), such as a tilting motion, to achieve optical image stabilization.

Figure 4:
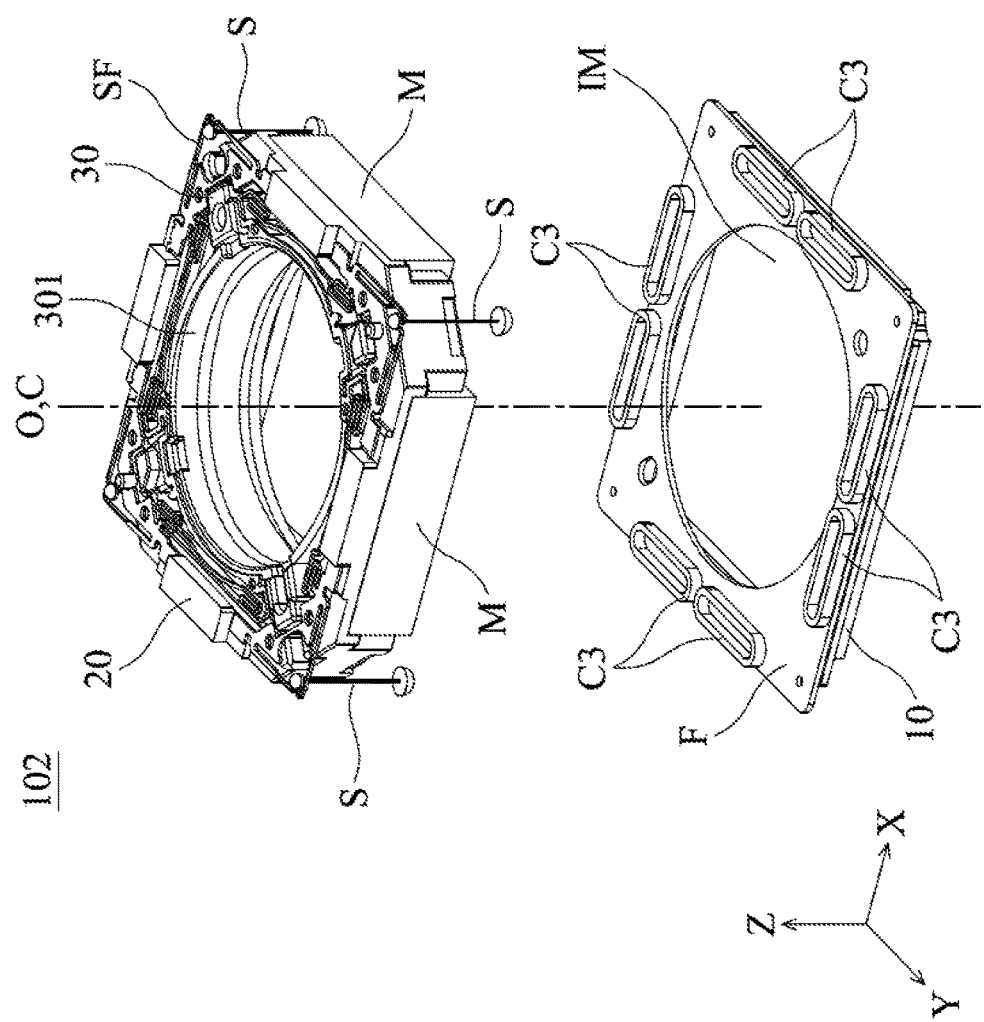
FIG. 4 is a schematic diagram of a camera module 102 according to another embodiment of the invention.

FIG. 4 is a schematic diagram of a camera module 102 according to another embodiment of the invention. The main difference between the camera module 102 and the camera module 100 (FIGS. 1 to 3) is that the camera module 102 comprises a plurality of first driving coils C3 disposed on the circuit board F, wherein two first driving coils C3 are disposed on each side of the circuit board F. It should be understood that the first driving coils C3 disposed on the four sides of the circuit board F respectively correspond to the four magnetic elements M disposed on the four sides of the frame 20. Thus, driving signals can be independently applied to the respective first driving coils C3 by an external power source, and a magnetic force can be provided by the interaction between the first driving coils C3 and the magnetic elements M, so that the plate 10 and the image sensor IM can be forced to move linearly relative to the frame 20 and the holder 30 in a direction that is substantially perpendicular to the optical axis O, or tilt relative to the frame 20 and the optical axis O of the optical lens, or rotate around the central axis C (or optical axis O), to achieve a better optical image compensation effect.

Figure 5:
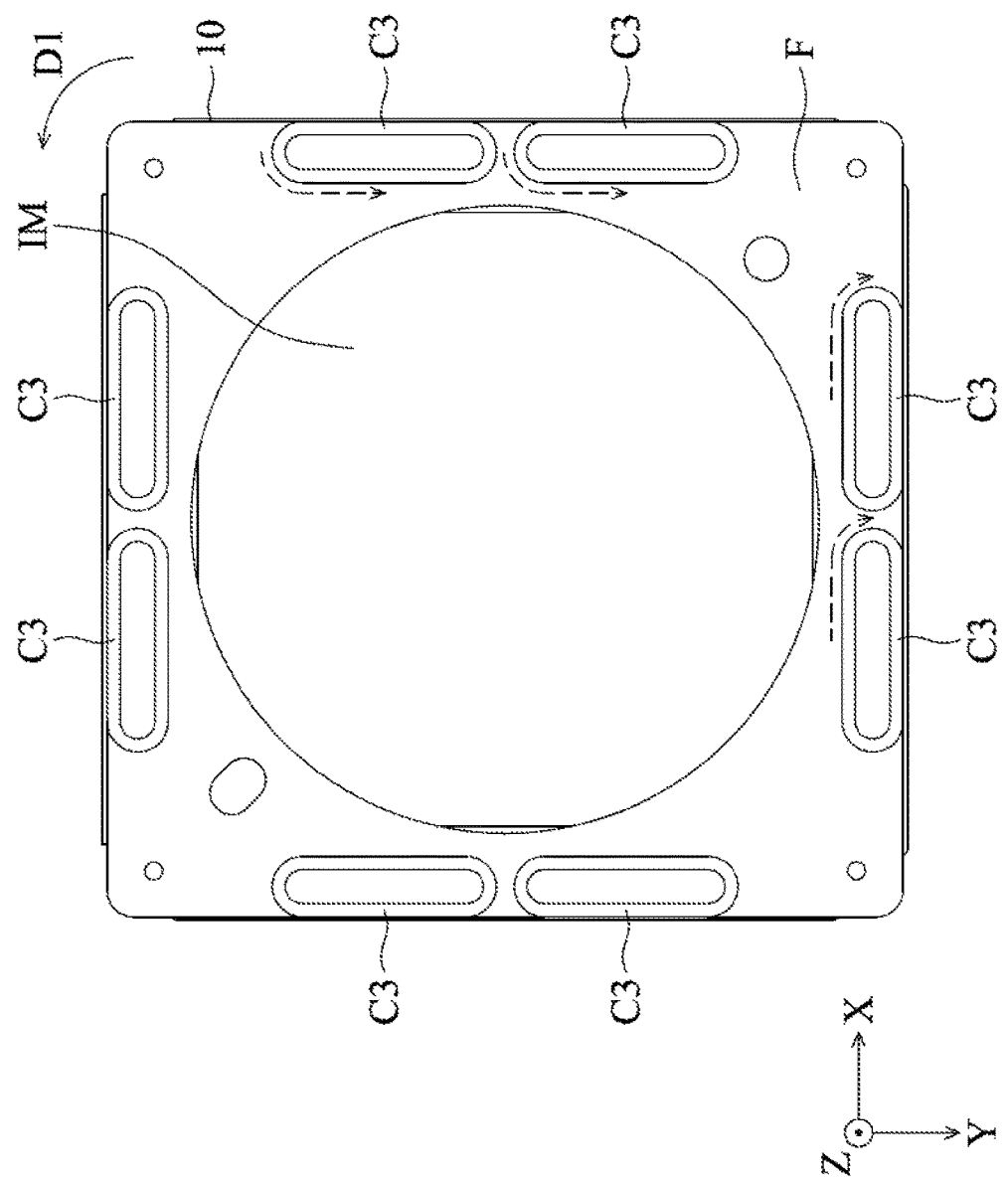
FIG. 5 is a schematic diagram of driving signals applied to the first driving coil C3 to move the plate and the image sensor.

There is an example for the movement of the electromagnetic driving assembly (including the driving first driving coils C3 and the magnetic elements M) forcing the plate 10 and the image sensor IM to move relative to the frame 20 and the holder 30. As shown in FIG. 5, applying different driving signals to the four first driving coils C3 (at the right and the lower sides in FIG. 5), wherein the broken lines represent the current direction (the current values of two first driving coils C3 at the same side can be different), so that the first driving coils C3 can interact with the magnetic elements M (FIG. 4) to provide a magnetic force (along the direction D1 in FIG. 5) to rotate the plate 10 and the image sensor IM around the central axis C or the optical axis O relative to the frame 20 and the holder 30. Furthermore, if driving signals are only applied to the two first driving coils C3 at the lower sides in FIG. 5, the plate 10 and the image sensor IM can be tilted relative to the frame 20, holder 30, and the optical axis O of the optical lens.

Figure 6:
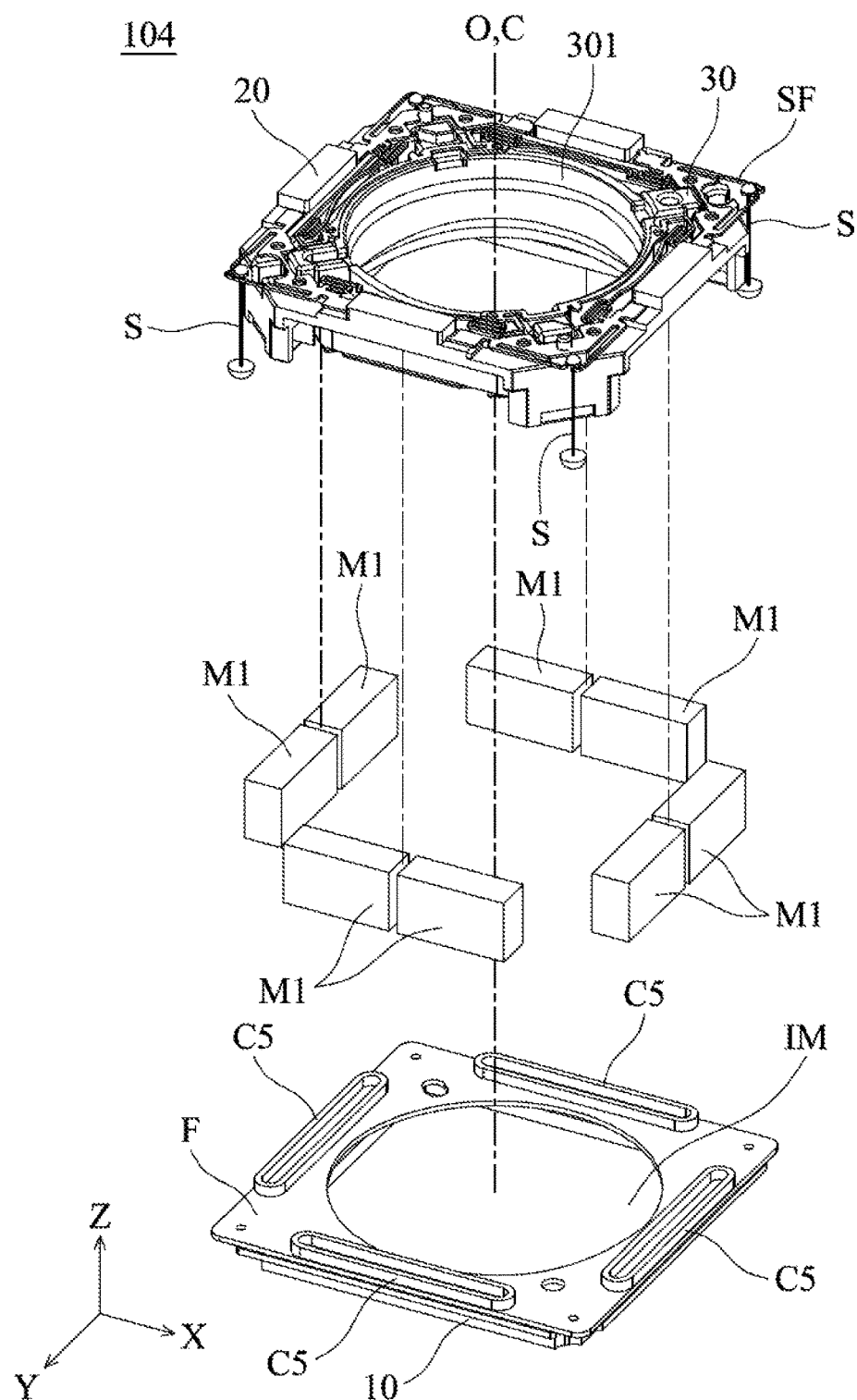
FIG. 6 is a schematic diagram of a camera module 104 according to another embodiment of the invention.

FIG. 6 is a schematic diagram of a camera module 104 according to another embodiment of the invention. The main difference between the camera module 104 and the camera module 100 (FIGS. 1-3) is that the camera module 104 comprises a plurality of first driving coils C3 and a plurality of magnetic elements M1 which constitute the electromagnetic driving assembly MC. The four sides of the circuit board F are respectively provided with one first drive coil C5, and two magnetic elements M1 are provided on each side of the frame 20 correspondingly. By applying one or more appropriate driving signals to the electromagnetic driving assembly MC, the plate 10 and the image sensor IM can move linearly along the optical axis O or central axis C with respect to the optical lens, can be tilted relative to the optical axis O, or can rotate around the optical axis O or central axis C, to achieve a better optical image compensation effect.

Figure 7:
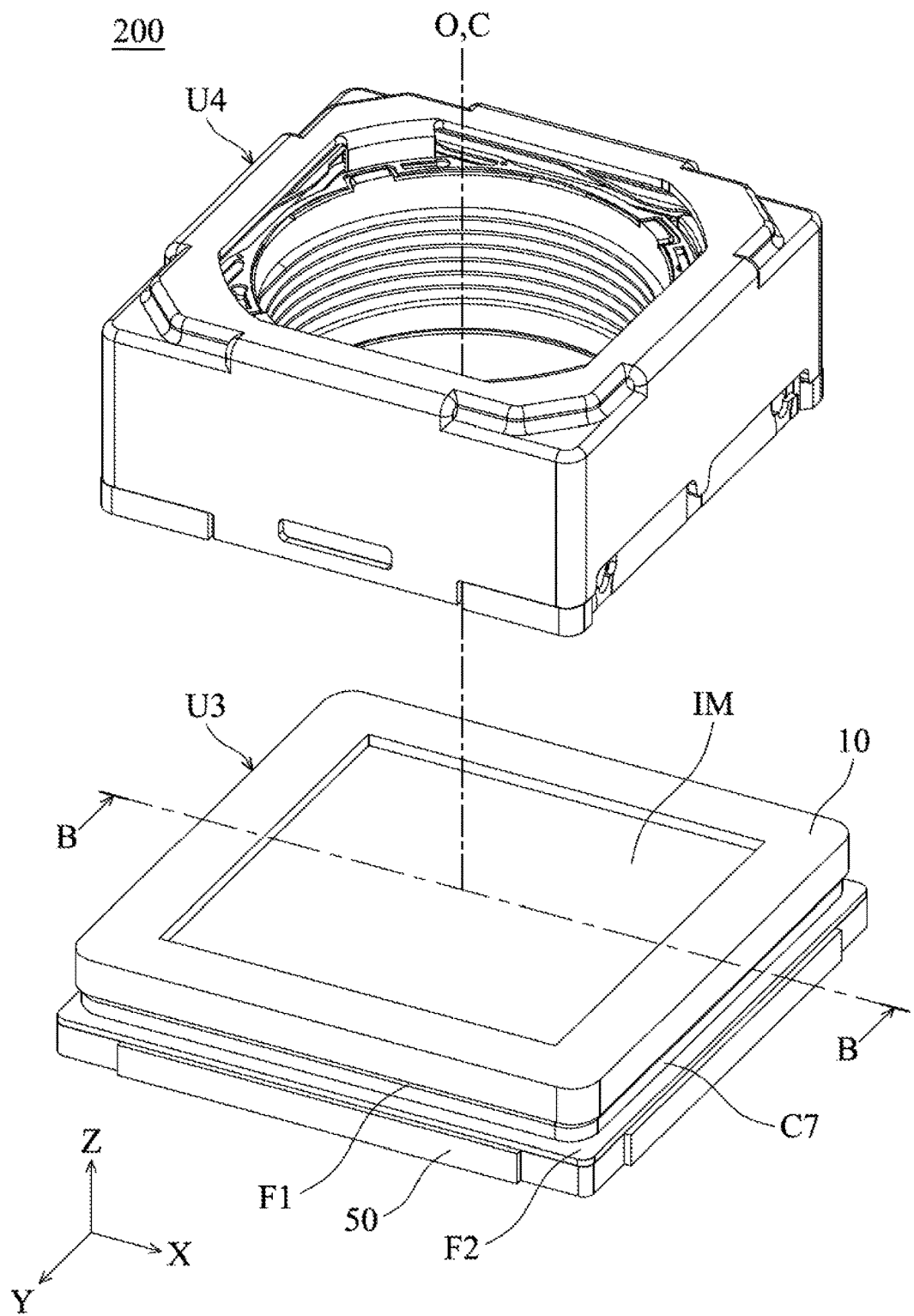
FIG. 7 is a schematic diagram of a camera module 200 according to another embodiment of the invention.
Figure 8:
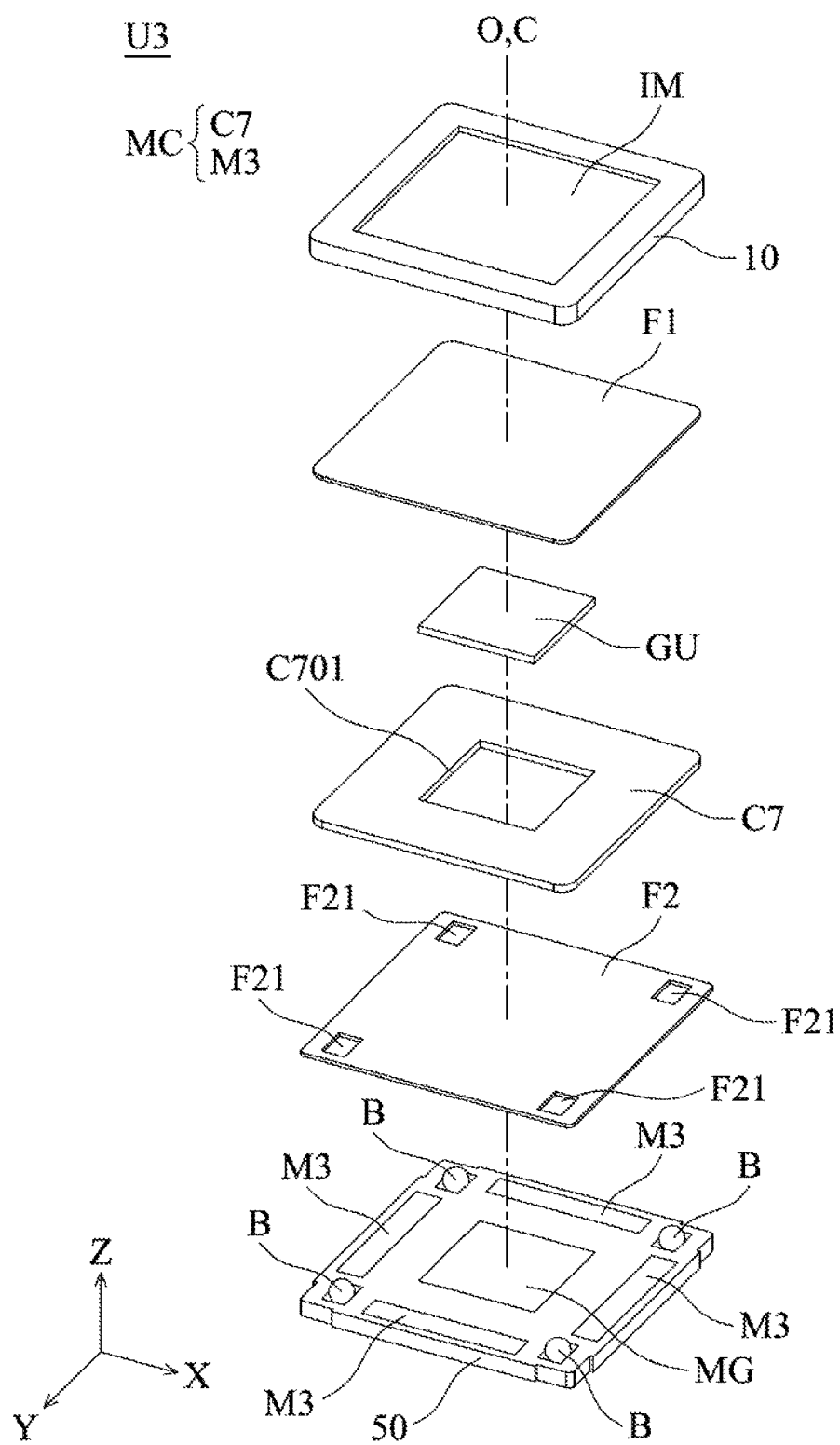
FIG. 8 is an exploded view of the photosensitive unit U3 in FIG. 7.

FIGS. 7-8 are schematic diagrams of a camera module 200 according to another embodiment of the invention. The camera module 200 primarily comprises a photosensitive unit U3 and a lens unit U4, wherein the lens unit U4 is disposed on the photosensitive unit U3 and is affixed to a plate 10 of the photosensitive unit U3. The lens unit U4, for example, is a lens driving mechanism having optical image stabilization, and the composition is substantially the same as the lens unit U2 (FIG. 1) with the appearances thereof being slightly different. The same elements corresponding to the aforementioned embodiment are not described again here in detail.

As shown in FIGS. 7-8, the photosensitive unit U3 primarily includes: a plate 10, an image sensor IM, a circuit board F1, a first driving coil C7 (such as a flat coil), a permeability element, a plurality roller (connecting members) B, a circuit board F2, and a bottom 50. The plate 10 sustains the image sensor IM and is affixed to the circuit board F1 and the first driving coil C7: in other words, the plate 10, the circuit board F1, and the first driving coil C7 are connected to each other. The substantially rectangular first driving coil C7 has a hollow structure C701, and the permeability element GU can be disposed therein. The bottom 50 may be affixed to a casing of an electronic device, wherein a plurality of magnetic elements M3 are disposed (or embedded) in or disposed on the bottom 50, and the circuit board F2 is disposed on the bottom 50. The magnetic elements M3 face the first driving coil C7 to constitute an electromagnetic driving assembly MC. Moreover, as shown in FIG. 9, a gap G is formed between the circuit board F2 connected to the bottom 50 and the first driving coil C7 connected to the plate 10.

Figure 9:
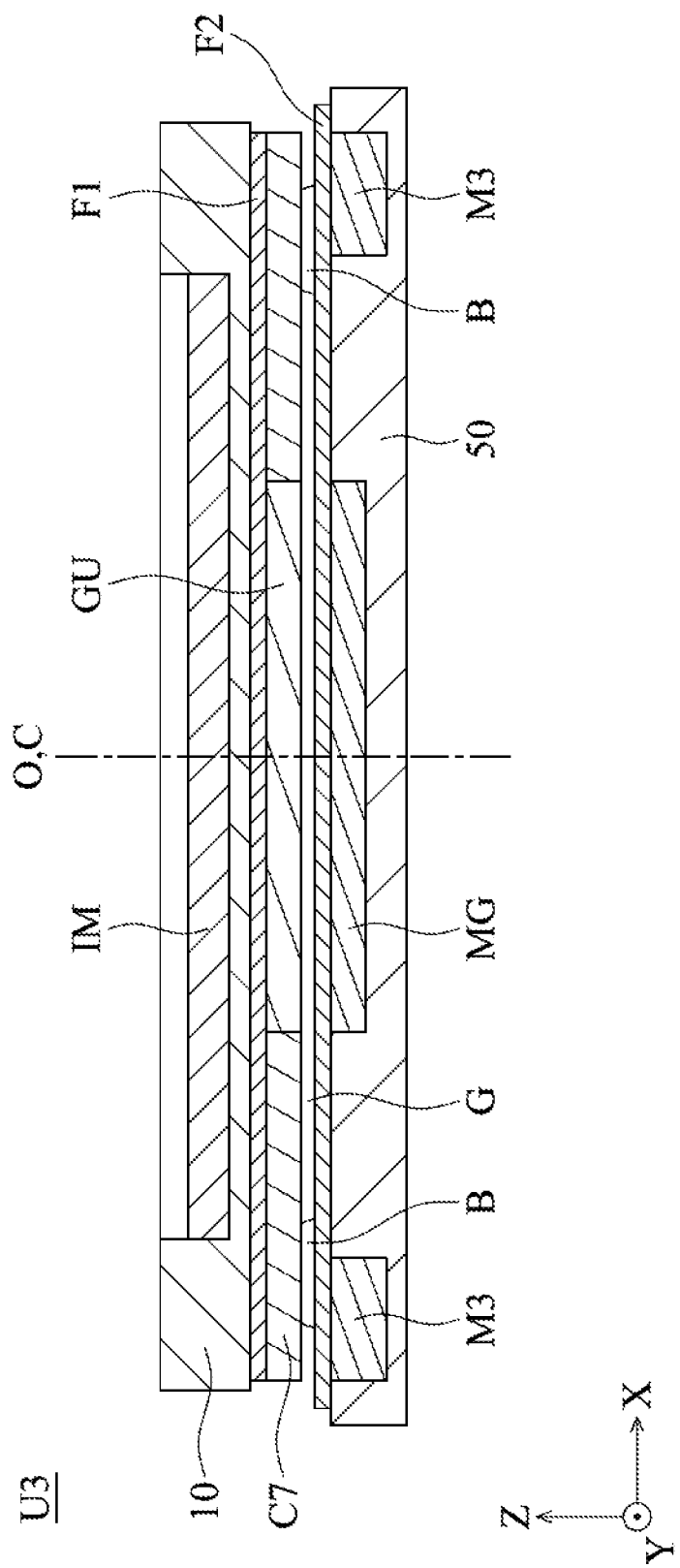
FIG. 9 is a sectional view diagram of the photosensitive unit U3 taken along line B-B in FIG. 7.

Referring to FIGS. 8-9, the plate 10 and the bottom 50 can be movably connected by the rollers B. Specifically, the rollers B, such as rolling balls, are correspondingly situated at the four corners of the first driving coil C7 and are in contact with the first driving coil C7 and the bottom 50, wherein the rollers B respectively pass through a plurality of through holes F21 in the circuit board F2. When a driving signal is applied to the first driving coil C7 to provide a magnetic force by the interaction between the first driving coil C7 and the magnetic elements M3, the rollers B can successfully guide the first driving coil C7 to force the plate 10 and the image sensor IM disposed thereon to move linearly relative to the bottom 50 in a direction that is substantially perpendicular to the central axis C of the plate 10 (XY-plane). Thus, optical image stabilization can be achieved.

Due to the lens unit U4 and the plate 10 being affixed to each other, the first driving coil C7 can force the plate 10, image sensor IM, and the lens unit U4 to move together relative to the bottom 50, to perform auto-focusing and image compensation. Furthermore, as shown in FIGS. 7-8, in the direction of the central axis C of the plate 10 (Z-axis), the plate 10 and the image sensor IM are situated between the lens unit U4 and the electromagnetic driving assembly MC (including the magnetic elements M3 and the first driving coil C7).

Figure 10:
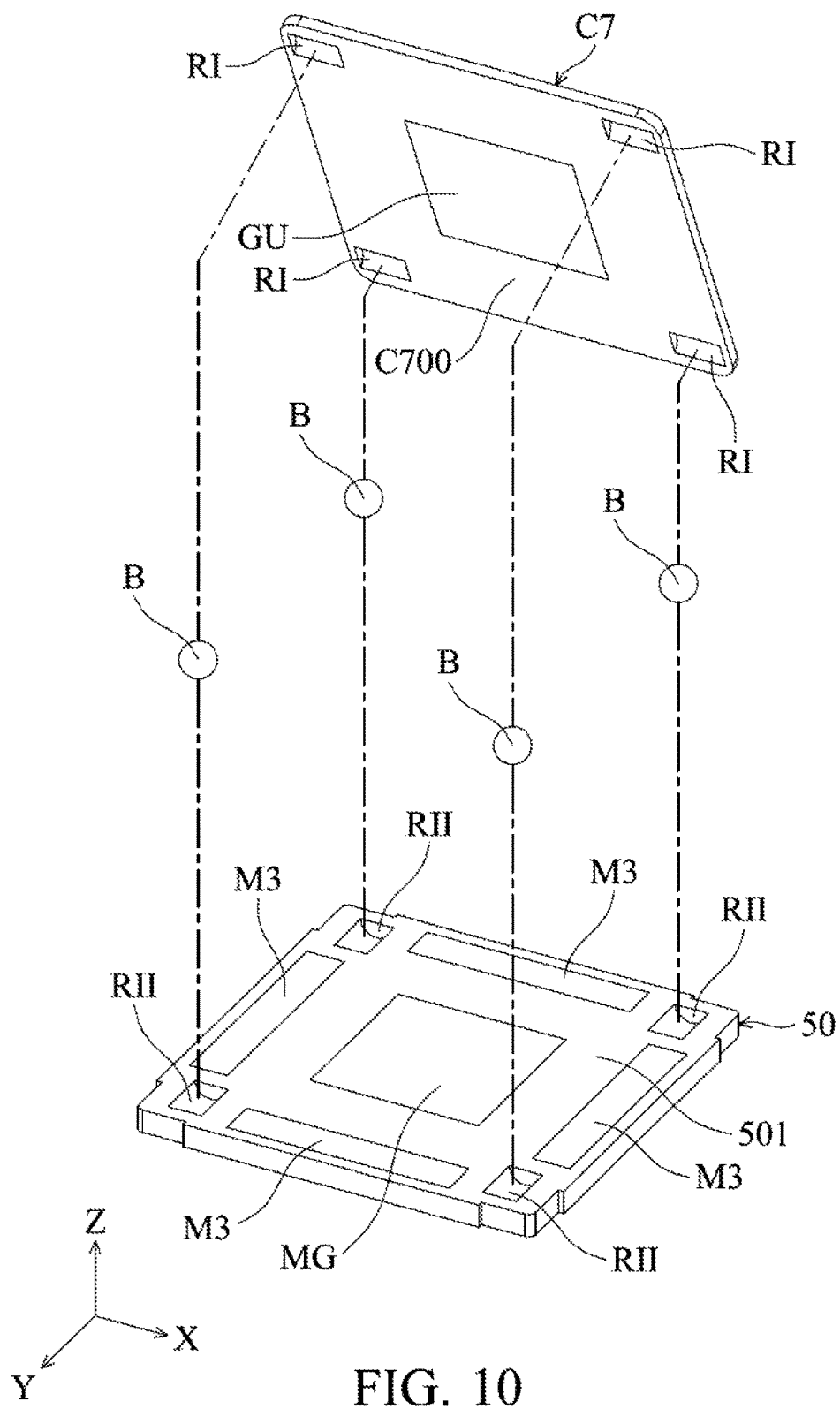
FIG. 10 is a schematic diagram of the bottom 50, the rollers B, and the first driving coil C7.

It should be noted that, as shown in FIG. 10, a plurality of recesses RI are formed on a lower surface C700 of the first driving coil C7, a plurality of recesses RII are formed on an upper surface 501 of the bottom 50. A portion of each roller B is received in the corresponding recesses RI and RII which are configured to guide the roller B for rolling. The recesses RI and RII have elongated rectangular shapes, wherein the recesses RI extend in a first direction (substantially parallel to the X-axis), the recesses RII extend in a second direction (substantially parallel to the Y-axis), and the first and second directions are substantially perpendicular to each other. Thus, the rollers B can successfully roll in the two different directions: the first and second directions on the XY-plane, so that the camera module 200 has good optical image compensation.

In the present embodiment, a magnet MG is embedded in or disposed on the frame 50, as shown in FIG. 8. The magnet MG is at least partially overlapping the permeability element GU in the direction of the central axis of the plate 10 (Z-axis), and can interact with the permeability element GU (e.g. attracting the permeability element GU). Thus, the rollers B are more tightly sandwiched between the bottom 50 and the plate 10, and the rollers B are prevented from falling off. Furthermore, due to the permeability element GU adjacent to the image sensor IM (as shown in FIGS. 8-9), the permeability element GU can help the image sensor IM to dissipate heat and block the electromagnetic interference generated by other electronic components in the electronic device, to enhance the performance and longevity of the image sensor IM.

Figure 11:
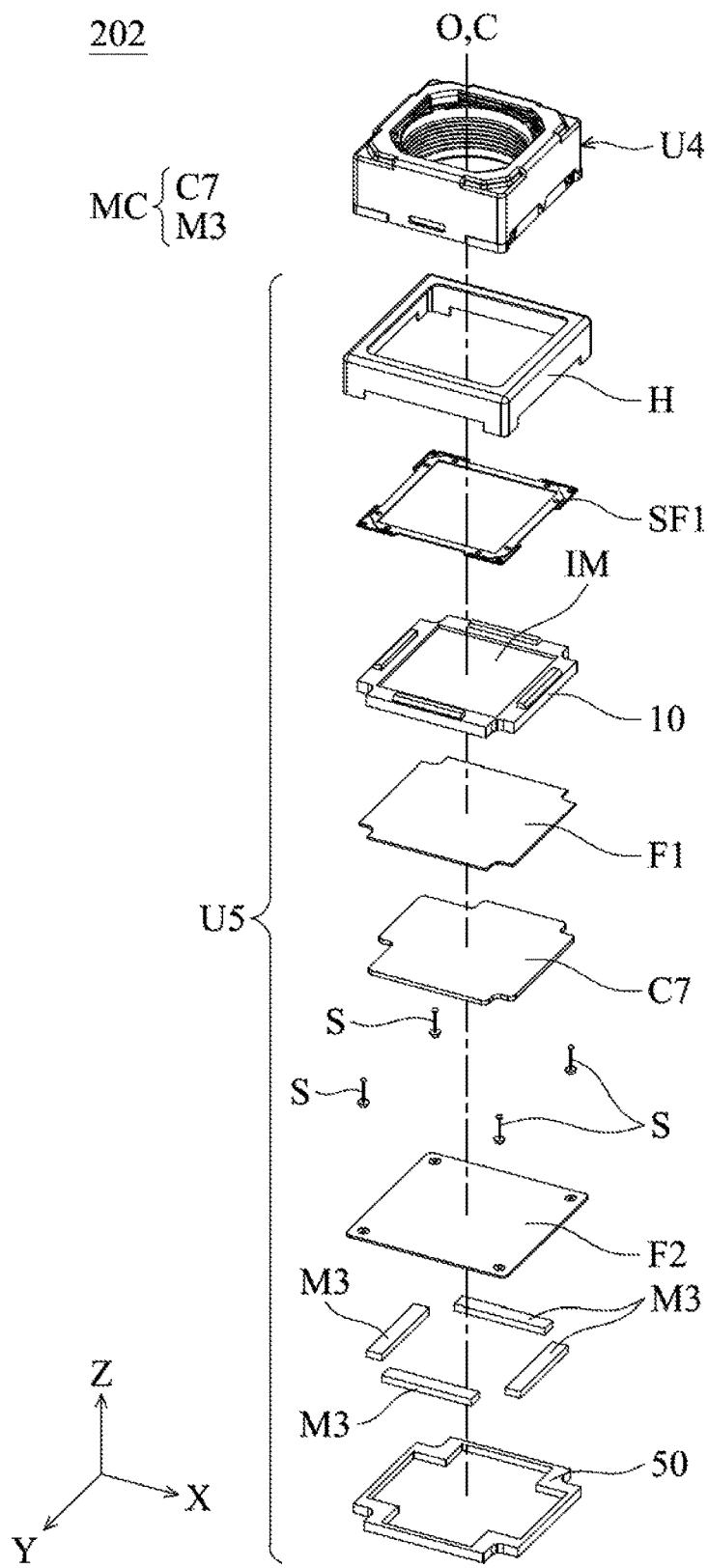
FIG. 11 is a schematic diagram of a camera module 202 according to another embodiment of the invention.

FIG. 11 is a schematic diagram of a camera module 202 according to another embodiment of the invention. The main difference between the camera module 202 and the camera module 200 (FIG. 7) is that the photosensitive unit U5 of the camera module 202 comprises a plurality of elastic elements S and a sheet-shaped upper spring SF1. The plate 10 and the bottom 50 are connected via the upper spring SF1 and the elastic elements S. The lens unit U4 is disposed on a housing H of the photosensitive unit U5. The same elements corresponding to the aforementioned embodiment (FIG. 7) are not described again here in detail.

Figure 12:
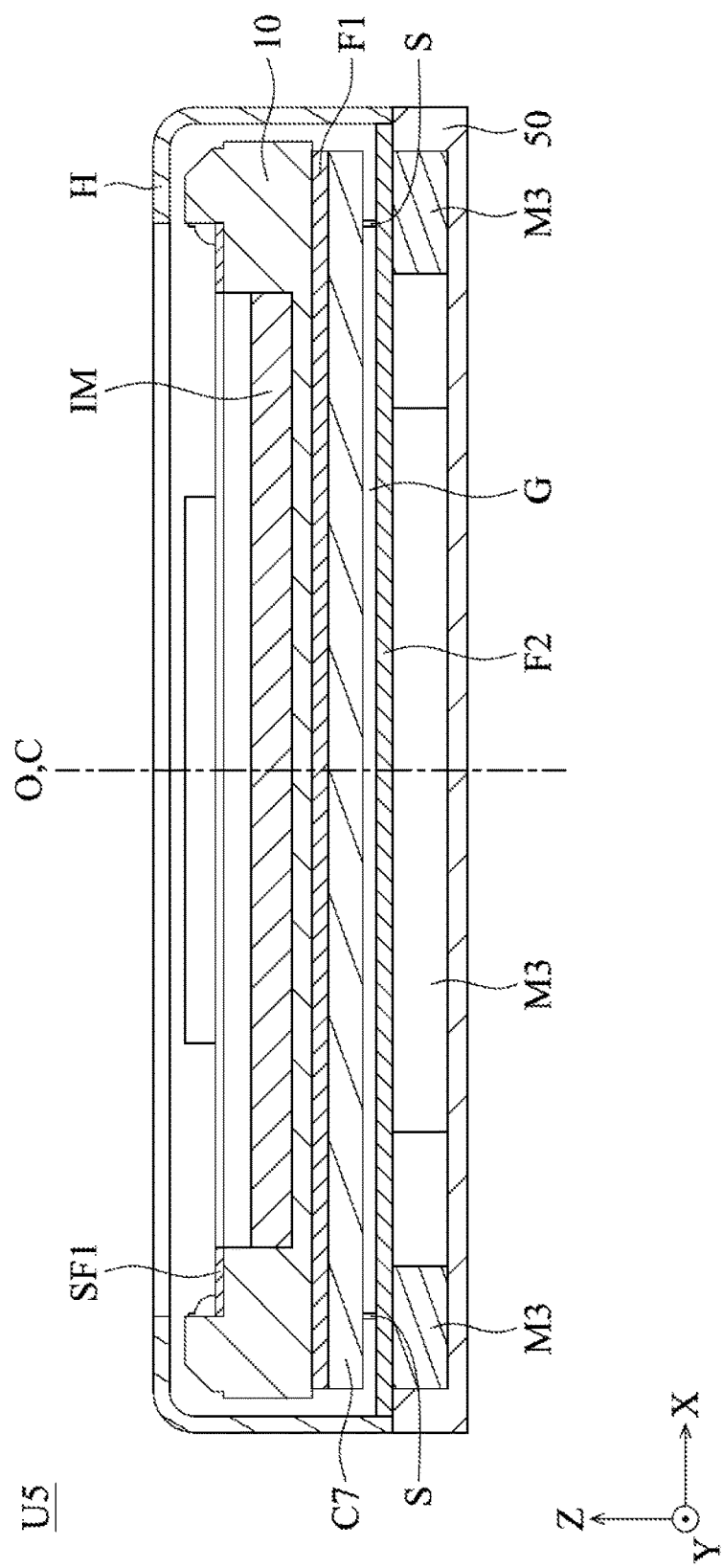
FIG. 12 is a schematic diagram of the photosensitive unit U5 in FIG. 11 after assembly.

The photosensitive unit U5 is discussed in detail below. As shown in FIG. 12, the upper spring SF connects to the plate 10 (for example, they are connected by an engaging means or an adhesive), and the two ends of each elastic element S are respectively connect to the upper spring SF and the circuit board F2, so that the plate 10 is movably suspended from the bottom 50. The magnetic elements M3 disposed on the bottom 50 face the first driving coil C7 which constitute the electromagnetic driving assembly MC, and a gap G is formed between the circuit board F2 and the first driving coil C7. When a driving signal is applied to the first driving coil C7 and the first driving coil C7 interacts with the magnetic elements M3 to generate a magnetic force, the electromagnetic driving assembly MC can force the plate 10 and the image sensor IM to move linearly relative to the bottom 50 in a direction that is perpendicular to the central axis C of the plate 10 (XY-plane), so that the camera module 202 has the function of optical compensation.

Figure 13:
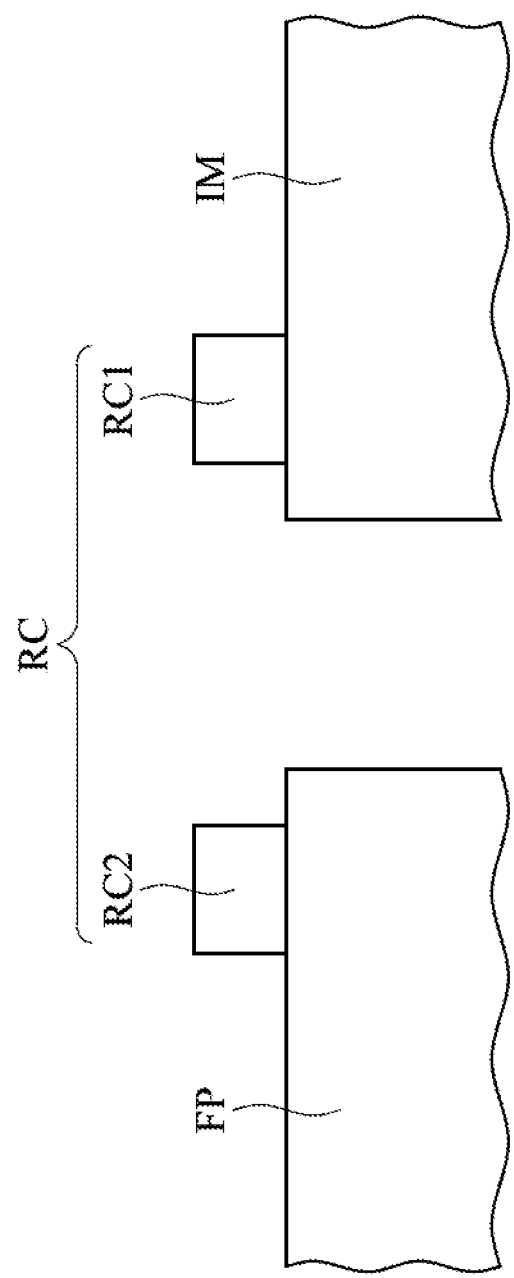
FIG. 13 is a schematic diagram of an optical transceiver assembly that is arranged on a circuit board and the image sensor.

FIG. 13 is a schematic diagram of an optical transceiver assembly RC arranged on a circuit board FP and the image sensor IM. The circuit board FP, for example, may be affixed to a casing of the electronic device, and an optical signal can be bi-directionally transmitted through the optical transceiver assembly RC between the image sensor IM and the circuit board FP. The optical transceiver assembly RC includes a first optical coupling element RC1 and a second optical coupling element RC2 disposed on the image sensor IM and the circuit board FP, respectively. When an image is acquired by the image sensor IM from the outside, the optical transceiver assembly RC will transmit the image information to the circuit board FP in the form of optical signal, so that there is no need to set an additional physical wire to achieve signal transmission, thereby saving space. Furthermore, the optical transceiver assembly RC may be disposed on the image sensor IM in the foregoing embodiments and other circuit board (e.g., the aforementioned circuit board F, F1, or F2 or the other one circuit board disposed in an electronic device).

In summary, a camera module is provided. The camera module is disposed in an electronic device and comprises a frame, a holder, an image sensor, a plate, an electromagnetic driving assembly, and an elastic element. The frame connects the holder to the plate, the holder is configured to sustain an optical lens, and the image sensor is disposed on the plate. The elastic element connects the frame to the plate, and a gap is formed between the frame and the plate. The electromagnetic driving assembly includes a magnetic element and a first driving coil and is configured to force the plate and the image sensor to move relative to the frame, the holder, and the optical lens, to achieve optical focusing and optical image compensation. Moreover, the camera module may further comprise a second driving coil disposed on the holder. The holder and the optical lens can move relative to the frame, the plate, and the image sensor by the interaction between the second driving coil and the magnetic element. Therefore, optical image compensation of the camera module can be achieved to improve image quality.

In addition, another camera module is provided. The camera module is disposed in an electronic device, comprising a lens unit, an image sensor, a plate, a bottom, and an electromagnetic driving assembly. The plate sustains the image sensor, the lens unit is disposed on the plate, and the bottom is affixed to a casing of the electronic device and connected to the plate. The electromagnetic driving assembly is disposed on the plate and the bottom and configured to force the plate and the image sensor to move relative to the bottom, so that the camera module has function of optical image stabilization.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A camera module, disposed in an electronic device, comprising:
   a holder, configured to sustain an optical lens;
   a frame, affixed to a casing of the electronic device and connected to the holder, wherein the frame cannot be moved relative to the electronic device;
   an image sensor;
   a plate, with the image sensor disposed thereon;
   an elastic element, connecting the frame and the plate;
   an electromagnetic driving assembly, disposed on the frame and the plate, and configured to force the plate and the image sensor to move relative to the frame, the holder and the electronic device,
   wherein the elastic element is extended along an optical axis of the optical lens and connects the frame to the plate; and
   a circuit board, wherein the electromagnetic driving assembly includes a first driving coil, wherein the circuit board is affixed between the first driving coil and the plate, and the elastic element connects to the circuit board.

2. The camera module as claimed in claim 1, further comprising an upper spring connecting the frame to the holder, wherein the elastic element connects to the upper spring.

3. The camera module as claimed in claim 1, further comprising an optical transceiver assembly including a first optical coupling element and a second optical coupling element which are respectively disposed on the image sensor and the circuit board, configured to transmit an optical signal.

4. The camera module as claimed in claim 1, wherein the electromagnetic driving assembly includes a magnetic element and a first driving coil, wherein the magnetic element is disposed on the frame, and the first driving coil is disposed on the plate.

5. The camera module as claimed in claim 4, wherein the first driving coil is disposed between the magnetic element and the plate along an optical axis of the optical lens, and a gap is formed between the first driving coil and the magnetic element.

6. The camera module as claimed in claim 4, further comprising a second driving coil disposed around the holder, wherein when a magnetic force is provided by the interaction between the magnetic element and the second driving coil, the holder and the optical lens move relative to the frame along an optical axis of the optical lens.

7. The camera module as claimed in claim 4, wherein the electromagnetic driving assembly further includes a plurality of first driving coils disposed on the same side of the plate, and when a magnetic force is provided by the interaction between the magnetic element and the first driving coils, the plate and the image sensor move relative to the frame and the holder.

8. The camera module as claimed in claim 4, wherein the electromagnetic driving assembly further includes a plurality of first driving coils and a plurality of magnetic elements, and the first driving coils are disposed on different sides of the plate, wherein when a magnetic force is provided by the interaction between the magnetic elements and the first driving coils, the plate and the image sensor move relative to the frame and the holder.

9. The camera module as claimed in claim 4, wherein the electromagnetic driving assembly further includes a plurality of magnetic elements disposed on the same side of the frame, wherein a magnetic force is provided between the magnetic elements and the first driving coil to force the plate and the image sensor to move relative to the frame and the holder.

* * * * *